US010393262B2

(12) United States Patent
Mayer

(10) Patent No.: US 10,393,262 B2
(45) Date of Patent: Aug. 27, 2019

(54) HYDROSTATIC TRACTION DRIVE AND METHOD FOR CONTROLLING THE HYDROSTATIC TRACTION DRIVE

(71) Applicant: Robert Bosch GmbH, Stuttgart (DE)

(72) Inventor: Jochen Mayer, Giengen an der Brenz (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 15/487,552

(22) Filed: Apr. 14, 2017

(65) Prior Publication Data

US 2017/0314675 A1    Nov. 2, 2017

(30) Foreign Application Priority Data

Apr. 28, 2016  (DE) .................. 10 2016 207 229

(51) Int. Cl.
*F16H 61/47*   (2010.01)
*B60K 17/346*  (2006.01)
*F16H 61/425*  (2010.01)
*F16H 61/472*  (2010.01)
*B60K 17/348*  (2006.01)
(Continued)

(52) U.S. Cl.
CPC .......... *F16H 61/47* (2013.01); *B60K 17/348* (2013.01); *B60K 17/3462* (2013.01); *B60K 17/35* (2013.01); *B60K 23/04* (2013.01); *F16H 61/425* (2013.01); *F16H 61/472* (2013.01); *B60K 2023/046* (2013.01); *B60Y 2400/424* (2013.01); *F16H 47/04* (2013.01); *F16H 48/22* (2013.01);
(Continued)

(58) Field of Classification Search
CPC ........ F16H 61/47; F16H 61/472; F16H 48/22; F16H 2059/506; F16H 61/425; B60K 17/35; B60K 17/3462; B60K 23/04
See application file for complete search history.

(56) References Cited

U.S. PATENT DOCUMENTS 4,399,886 A * 8/1983 Pollman ................ F16H 61/423
                                                180/197
5,201,570 A * 4/1993 Heren ................... B60K 17/356
                                                180/197
(Continued)

FOREIGN PATENT DOCUMENTS

DE      42 06 833 C1    1/1993
DE  10 2010 045 541 A1  3/2012
EP       1 771 313 B1    3/2008

*Primary Examiner* — Stacey A Fluhart
(74) *Attorney, Agent, or Firm* — Maginot, Moore & Beck LLP

(57) ABSTRACT

A hydrostatic traction drive includes a first hydraulic machine that is coupled to a drive unit. The first hydraulic machine is hydraulically arranged in a hydraulic circuit with a second hydraulic machine. The second hydraulic machine has a drive shaft that is connected in a rotationally fixed fashion to a lockable differential. The traction drive has a control unit that is configured so as to control at least one measure for traction control as a function of a rotational speed of the second hydraulic machine. The at least one measure includes one or more of a measure for detecting a loss of traction and a measure for overcoming the loss of traction. A method for controlling the traction drive includes eliminating a loss of traction of the traction drive with use of the control unit as a function of the rotational speed of the second hydraulic machine.

14 Claims, 1 Drawing Sheet

(51) Int. Cl.
    *B60K 17/35*        (2006.01)
    *B60K 23/04*        (2006.01)
    *F16H 59/50*        (2006.01)
    *F16H 47/04*        (2006.01)
    *F16H 48/22*        (2006.01)
    *F16H 61/42*        (2010.01)

(52) U.S. Cl.
    CPC ........ *F16H 61/42* (2013.01); *F16H 2059/506* (2013.01)

(56) References Cited

U.S. PATENT DOCUMENTS

| | | | | |
|---|---|---|---|---|
| 5,775,453 | A * | 7/1998 | Williams | B60K 17/356 180/197 |
| 6,135,231 | A * | 10/2000 | Reed | B60K 23/0808 180/307 |
| 6,877,577 | B1 * | 4/2005 | Smith | B60K 6/12 180/197 |
| 7,121,374 | B1 * | 10/2006 | Ho | A01D 41/1274 180/242 |
| 7,896,123 | B2 * | 3/2011 | Ohashi | B60K 7/0015 180/242 |
| 2005/0217261 | A1 * | 10/2005 | Hofer | B60K 17/10 60/445 |
| 2011/0048829 | A1 * | 3/2011 | Matsumoto | F16H 61/435 180/197 |

\* cited by examiner

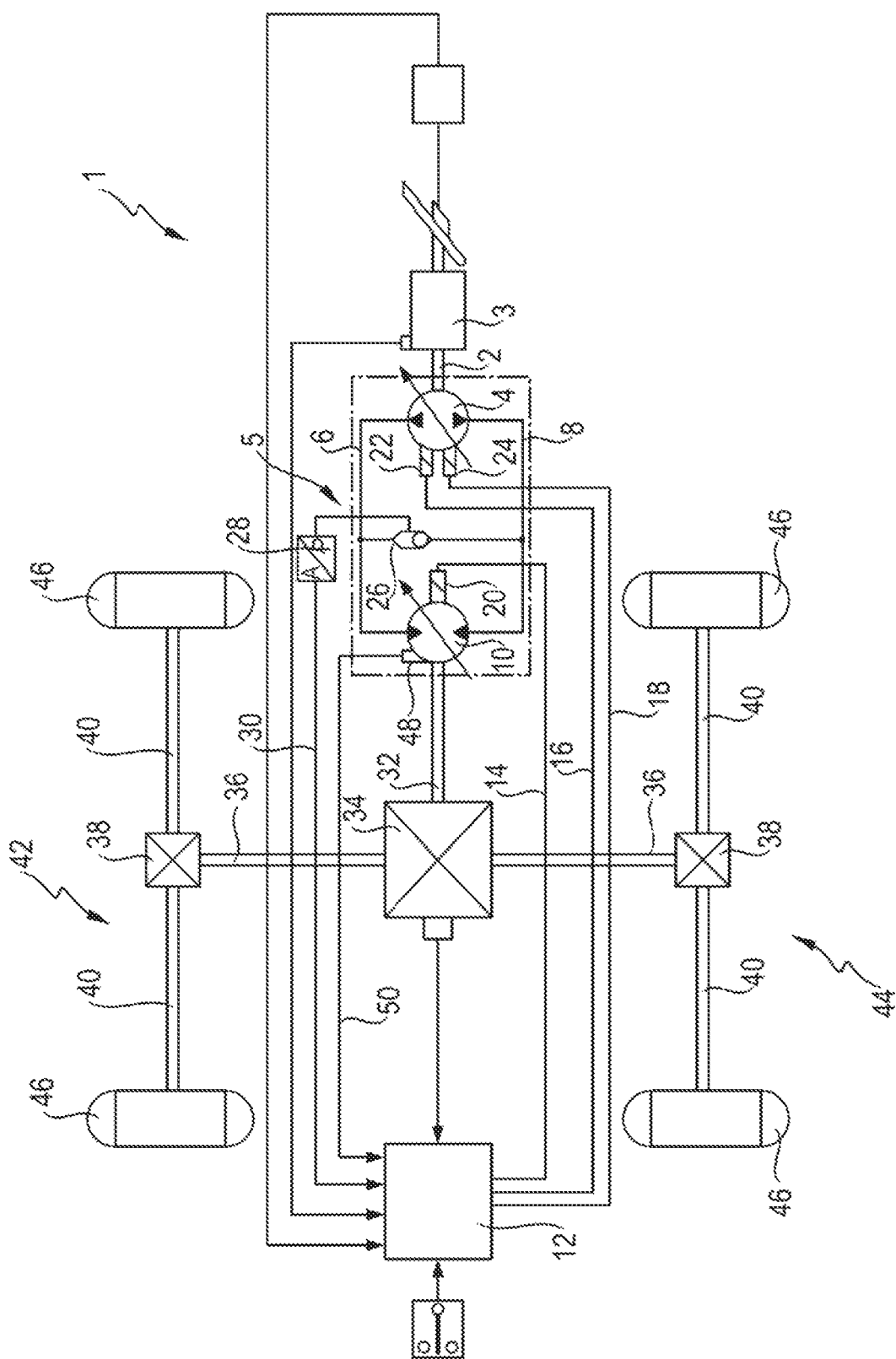

HYDROSTATIC TRACTION DRIVE AND METHOD FOR CONTROLLING THE HYDROSTATIC TRACTION DRIVE

This application claims priority under 35 U.S.C. § 119 to patent application no. DE 10 2016 207 229.3, filed on Apr. 28, 2016 in Germany, the disclosure of which is incorporated herein by reference in its entirety.

BACKGROUND

The disclosure relates to a hydrostatic traction drive and to a method for controlling the hydrostatic traction drive.

It is known that hydrostatic traction drives for mobile machines, such as for example wheel loaders or telescopic handlers, are equipped with hydraulic pumps and hydraulic motors which interact as a hydrostatic transmission in a hydraulic circuit, such as is presented for example in document DE 10 2010 045 541 A1 of the applicant. It is customary here that an internal combustion engine, for example a diesel engine, drives the hydraulic pump via a shaft. The hydraulic power of the pump is subsequently fed in the form of a volume flow and pressure to the hydraulic motor via the high-pressure side of the hydraulic circuit of the hydrostatic transmission, said motor in turn converting said hydraulic power into mechanical power. This mechanical power is composed of the rotational speed and the torque on the drive shaft of the hydraulic motor.

A basic design of such a hydrostatic traction drive is presented in document DE 42 06 833 C1.

The torque which is generated in this way is distributed to the front axle and rear axle in all-wheel-drive vehicles via distributed differentials. The axle differential, which distributes the torque made available for the respective axle further onto the individual wheels is located between the driven wheels of the respective axle. Differentials also serve here to equalize differences in rotational speed between the wheels or shafts, for example during the cornering of a dump truck, during which the wheels travel along paths of different lengths. In contrast, when the traction of a drive wheel is lost, undesired differences in rotational speed of the wheels occur. Loss of traction occurs when there is a sudden rise in the rotational speed of the respective drive wheel and a simultaneous reduction in the torque. The reduction of the torque relates here to the entire drive train. A possible path for recovering the lost traction of the drive wheel is to lock affected differentials. For this purpose differential locks are used which can be activated manually or in an automated fashion by means of locking clutches. In the locked state of the differential, the respective wheels or their shafts are connected to one another in a rotationally fixed fashion in order to equalize their rotational speed.

In order to avoid the loss of traction, a differential lock can be engaged automatically on the basis of characteristic speed signals, rotational speed signals or torque signals at which experience has shown that there is a risk of loss of traction.

Document EP 1 771 313 B1 discloses such a procedure. Here, the velocity and the torque are detected continuously by means of sensors and compared by a control unit in such a way that when predetermined threshold values of the velocity and of the torque are exceeded the differential locks are switched on, activated or engaged automatically in order to avoid loss of traction. When the threshold values are undershot, the differential lock is opened again.

However, it is disadvantageous with this solution that an actual loss of traction cannot be detected. Critical driving situations are merely defined by means of the experience-based threshold values in which the connection of the differential lock takes place, in order to prevent a potentially occurring loss of traction.

Contrary to the above, the disclosure is based on the object of providing a hydrostatic traction drive which is better protected against the loss of traction while having a simple design. Furthermore, the object is based on providing a method for controlling the traction drive with which loss of traction which occurs can be detected and a countermeasure can be initiated.

SUMMARY

The first object is achieved by means of a hydrostatic traction drive having the features of the disclosure. Furthermore, the second object is achieved by means of a method for controlling a hydrostatic traction drive according to the disclosure.

Advantageous developments of the hydrostatic traction drive and the method are described in the dependent claims.

A hydrostatic traction drive, in particular for a mobile machine, has a first hydraulic machine which is driven by a drive unit, as well as a second hydraulic machine which is hydraulically connected to the first hydraulic machine, in particular in a closed circuit. A drive shaft of the second hydraulic machine can be or is connected in a rotationally fixed fashion to at least one, in particular lockable, differential of the traction drive in order to drive wheels or the like. The traction drive has here a control unit by means of which at least one measure for traction control, in particular for preventing a loss of traction and/or for restoring the traction, can be controlled. According to the disclosure, the control unit is configured in such a way that the measure can be controlled as a function of a rotational speed of the second hydraulic machine.

A traction range in which there is usually a risk of loss of traction, for example a working journey, is distinguished, in particular, by a low wheel speed and rotational speed as well as a high torque. Experience has shown that the detection of a loss of traction as a function of this low wheel speed proves to be susceptible to errors. According to the disclosure, this is counteracted by virtue of the fact that the measure for traction control is based on the rotational speed of the second hydraulic machine.

In contrast with the prior art there are the following advantages. On the one hand, the loss of traction is no longer merely accepted but also actually detected or determined. Furthermore, in the specified driving range the rotational speed of the second hydraulic machine—in its traction mode this traction drive acts, for example, as a hydraulic motor—can be higher than that of a wheel. As a result, the susceptibility to errors during the detection or the determination is lower. In total, the loss of traction can therefore be detected more reliably, and the measure for traction control can be controlled more reliably, and the loss of traction can be prevented and/or eliminated more reliably.

The rotational speed is preferably that of an engine, in particular of a cylinder drum, or of a drive shaft of the second hydraulic machine.

In one development, at least one of the hydraulic machines is embodied as an axial piston machine with a swash plate design or oblique axle design with an adjustable expulsion volume.

Within the scope of this patent application, the term "wheel" also stands, of course, for alternative drive means such as, for example, a chain or the like.

The drive unit is preferably embodied by means of an internal combustion engine, in particular a diesel engine.

In one advantageous development, the differential is of lockable design and the measure for traction control comprises locking of the respective differential.

In one development, the lockable differential is a distributor differential or central differential by means of which it is possible to distribute power of the drive shaft of the second hydraulic machine to a front axle and a rear axle of the traction drive. In this context, the distributor differential has an interaxle-differential lock which can be engaged in order to lock the distributor differential, in particular by means of the control unit, with the result that the front axle and the rear axle are connected to one another in a rotationally fixed fashion.

In another development, the lockable differential is an axle differential by means of which it is possible to distribute power of the drive shaft of the second hydraulic machine to wheels of an axle. In this context, the axle differential has an axle-differential lock which can be engaged in order to lock the axle differential, in particular by means of the control unit, with the result that the wheels of the respective axle are connected to one another in a rotationally fixed fashion.

In one development, both specified differentials, the distributor differential and the axle differential, can be locked by means of the control unit as a function of the rotational speed of the second hydraulic machine.

The axle-differential lock or interaxle-differential lock is preferably embodied as a clutch, in particular as a multi-disk clutch. In particular, the clutch is configured in such a way that it can be activated hydraulically by means of the control unit.

In one preferred embodiment, the drive shaft of the second hydraulic machine is coupled to the distributor differential. In contrast with this, it is possible for this drive shaft to be coupled to the axle differential.

In a further advantageous development, the measure for traction control comprises at least adapting, in particular reducing, a torque of the second hydraulic machine.

The second and/or the first hydraulic machines are/is configured with an adjustable expulsion volume, and the measure for traction control comprises adapting, in particular reducing, the expulsion volume of the second hydraulic machine and/or of the first hydraulic machine.

The reduction in the torque preferably takes place by means of the specified reduction in the expulsion volume as an additional measure for eliminating the loss of traction during or after the locking of the differential or differentials. Since the reduction in the expulsion volume is accompanied by a loss of power of the traction drive given a constant rotational speed of the drive unit, the locking of the differential or differentials preferably occurs firstly by means of the control unit, as a result of which a loss of power can be lower. If this measure does not bring about the desired result—the recovery of the traction—the specified reduction in the expulsion volume or volumes is implemented by means of the control unit as a supplementary measure.

In a further advantageous development, the control unit is configured in such a way that it can be used to control the measure as a function of a change in the rotational speed of the second hydraulic machine. The advantage here is that the change over time in the rotational speed of the second hydraulic machine is a reliable indicator for the loss of traction of a drive wheel.

The control unit is configured in one development in such a way that it can be used to differentiate the rotational speed of the second hydraulic machine as a function of time, as a result of which the control unit can be used to determine an angular acceleration of the second hydraulic machine, in particular of its drive shaft or engine. The angular acceleration can be considered here to be a time gradient of the specified rotational speed.

In one development, the traction drive has a detection unit by means of which the rotational speed of the second hydraulic machine or a rotational speed, dependent thereon, of a component which is connected in a rotationally fixed fashion to the drive shaft of the second hydraulic machine, can be detected. The component which is connected to the second hydraulic machine can be, for example, the distributor differential or axle differential or a shaft, such as for example a cardan shaft. An advantage with such a configuration is that detection of the rotational speed at the wheels, which is costly and susceptible to errors owing to the relatively low rotational speeds in machines and deployment vehicles and is put at risk of contamination and damage owing to the hard conditions of use "at the wheel" is dispensed with.

In one development, an, in particular parameterizable, limiting value of the change is stored in the control unit.

In addition, the control unit is configured in such a way that it can be used to determine upward transgression of the limiting value and implement the measure for traction control as a function thereof.

The limiting value is, in particular, a reliable increase in the rotational speed per unit of time or a reliable time gradient of the rotational speed and corresponds, in particular, to a maximum possible change in the rotational speed when the traction is formed.

Furthermore, a method for controlling a hydrostatic traction drive as described above, in particular for controlling a measure for traction control, preferably for preventing a loss of traction and/or to restore the traction, is disclosed. In this context, the control unit detects or determines a loss of traction and initiates the measure described above and/or controls it.

According to the disclosure, the method has for this purpose a step in which the control unit is used to control the measure as a function of the rotational speed of the second hydraulic machine.

The step of "controlling the measure as a function of the rotational speed of the second hydraulic machine by means of the control unit" comprises here a step of "locking the differential" and/or a step "adapting the torque of the second hydraulic machine".

The step "controlling the measure as a function of the rotational speed of the second hydraulic machine" takes place in one development by means of the control unit as a function of a change in this rotational speed over time.

The change in this rotational speed over time can be determined in one development using the control unit and by means of differentiation of the rotational speed.

In one development of the method, the loss of traction can be detected by means of the control unit by virtue of the fact that the control unit determines upward transgression of a limiting value of the change in this rotational speed over time. As a result, the differential is locked, by means of the control unit as a function of this upward transgression for example reduced by connecting the axle-differential lock and/or interaxle-differential lock and/or the specified torque of the second hydraulic machine.

BRIEF DESCRIPTION OF THE DRAWING

In the text which follows, an exemplary embodiment of a hydrostatic traction drive of a wheel loader is explained in more detail with reference to a figure.

This single FIGURE shows a circuit diagram of an exemplary embodiment of a hydrostatic traction drive.

DETAILED DESCRIPTION

The FIGURE shows a hydrostatic traction drive 1 of a wheel loader which has a drive unit 3 which is connected to a drive shaft 2. The drive unit 3 is embodied as a diesel engine and drives, with a preferably constant rotational speed via the drive shaft 2, a first hydraulic machine 4 which is configured with an adjustable expulsion volume. The first hydraulic machine 4 forms, together with a second hydraulic machine 10, a hydrostatic transmission 5. The hydraulic machines 4, 10 are connected hydraulically here via working lines 6 and 8, with the result that a closed hydraulic circuit is formed. The second hydraulic machine 10 is also configured with an adjustable expulsion volume. The two hydraulic machines 4, 10 are each configured as axial piston machines with a swash plate design. The transmission ratio of the hydrostatic transmission 5 is determined here by the expulsion volumes of the hydraulic machines 4, 10.

In particular, a control unit 12 is provided for detecting and for controlling the adjustment of a respective expulsion volume or swept volume of the hydraulic machines 4, 10. Said control unit 12 is connected via three signal lines 14, 16, 18 to proportional magnets 20, 22, 24 of the hydraulic machines 4, 10. In this context, an adjustment device (not illustrated) of the respective hydraulic machines 4, 10 can be activated by the proportional magnets 20, 22, 24 in order to adjust the expulsion volumes thereof electromagnetically.

A changeover valve 26, by means of which a higher of the two pressures of the working lines 6, 8 can be selected, is connected between the working lines 6, 8. A pressure-detection unit 28 is connected to an outlet of the changeover valve 26. This signal of said pressure-detection unit 28 is transferred to the control unit 12 via a signal line 30. In the traction drive shown in the illustration according to FIG. 1, load pressure or high pressure is present in the working line 6, whereas the working line 8 conducts low pressure. Accordingly, in the shown driving state of the pressure-detection unit 28 the pressure of the working line 6 is detected and signaled to the control unit 12.

The second hydraulic machine 10 is connected via a drive shaft 32 to a mechanical distributor differential 34. The latter is mechanically connected via, in each case, a shaft 36, in particular a cardan shaft as well as, in each case, an axle differential 38, to shafts 40 of a front axle 42 and a rear axle 44 with two drive wheels 46 in each case.

A rotational speed sensor 48, by means of which a rotational speed of the second hydraulic machine 10 can be detected, is connected to the control unit 12 via a signal line 50 for transmitting signals. In said control unit 12, the method for detecting traction and for traction control, already described generally above, is stored for implementation. A description of the method follows.

In order to evaluate the signal of the rotational speed sensor 48, a time gradient of the rotational speed of the second hydraulic machine 10, which corresponds to an angular acceleration of the second hydraulic machine 10, is determined by means of the control unit 12. Subsequently, the control unit 12 is used to carry out a comparison of the gradient with a limiting value, that is to say with a maximum permissible increase in the rotational speed over time or a maximum permissible, in particular positive, gradient of the rotational speed over time.

The limiting value is stored here in a parameterized form in the control unit 12 and corresponds to a maximum possible angular acceleration of the second hydraulic machine 10 when traction of the wheels 46 is present, wherein the maximum possible angular acceleration at least the measure corresponds to the maximum possible vehicle acceleration.

If upward transgression of the limiting value is determined by means of the control unit 12, it is accordingly possible to conclude therefrom with a high level of probability that a loss of traction of at least one of the wheels 46 is a reason for this excessive angular acceleration.

By means of the control unit 12, at least two measures—alternative to one another or complementary to one another—can subsequently be initiated by means of the control unit 12 in order to recover the traction.

On the one hand, this is a reduction in the torque of the second hydraulic machine 10. This can take place, for example, by means of the reduction of a pivoting angle of the second hydraulic machine 10 by means of the corresponding actuation of the proportional magnet 20. In order to subsequently prevent a resulting acceleration of the second hydraulic machine 10—the volume flow of the first hydraulic machine 4 initially remains the same—the expulsion volume of the first hydraulic machine 4 is additionally also adapted and reduced by means of the control unit 12, approximately simultaneously in the exemplary embodiment shown.

A second measure of the control unit 12 for recovering the traction of a drive wheel 46 is to connect axle-differential lock into the axle differential 38 and/or connect an interaxle-differential lock into the distributor differential 34. By connecting the axle-differential lock the shafts 40 of the respective axle 42, 44 can be connected to one another in a rotationally fixed fashion, and by connecting the interaxle-differential lock the shafts 36 can be respectively connected to one another in a rotationally fixed fashion.

If locking is carried out by means of an interaxle-differential lock using the distributor differential 34, the shafts 36 are connected to one another in a rotationally fixed fashion. This solution is preferred if both drive wheels 46 of a front axle 42 or a rear axle 44 are affected by the loss of traction.

According to the method, the two measures for preventing the loss of traction can be carried out simultaneously or in a chronologically independent sequence. For example, when the loss of traction is detected by means of the control unit 12 the latter can switch on the axle-differential locks. In the event of the traction not being covered again by means of this first measure, for example the torque of the second hydraulic machine 10 can be reduced. It is also possible for these two measures to be carried out simultaneously. It is also possible the control unit 12 is configured in such a way that it firstly carries out the measures to reduce the torque of the second hydraulic machine 10, and only after this first measure carries out the second measure, after which the axle differentials 38 and/or the distributor differential 34 are/is locked by means of an axle-differential lock or interaxle-differential lock.

A hydrostatic traction drive having a first hydraulic machine which is coupled to a drive unit is disclosed, wherein the first hydraulic machine is arranged hydraulically in a hydraulic circuit with a second hydraulic machine. A drive shaft of the second hydraulic machine is connected here in a rotationally fixed fashion to an, in particular, lockable differential. The traction drive has a control unit which is configured in such a way that it can be used to control at least one measure for traction control, in particular a measure for detecting a loss of traction and/or for eliminating the loss of traction, as a function of a rotational speed of the second hydraulic machine.

Furthermore, a method is disclosed for controlling the traction drive with which a traction loss of the traction drive can be eliminated by means of the control unit as a function of the rotational speed of the second hydraulic machine.

LIST OF REFERENCE NUMBERS 1 hydrostatic traction drive
2 drive shaft
3 drive unit
4 first hydraulic machine
5 hydrostatic transmission
6 working line
8 working line
10 second hydraulic machine
12 control unit
14 signal line
16 signal line
18 signal line
20 proportional magnet
22 proportional magnet
24 proportional magnet
26 changeover valve
28 pressure-detection unit
30 signal line
32 drive shaft
34 distributor differential
36 shaft
38 axle differential
40 shaft
42 front axle
44 rear axle
46 drive wheels
48 rotational speed sensor
50 signal line

What is claimed is:

1. A hydrostatic traction drive, comprising:
a first hydraulic machine that is driven by a drive unit
a second hydraulic machine hydraulically connected to the first hydraulic machine, the second hydraulic machine having a drive that is connected to at least one differential of the traction drive in order to drive wheels; and
a control unit configured to control at least one measure for traction control, the measure controlled as a function of a rotational speed of the second hydraulic machine,
wherein the control unit is configured so as to control the measure as a function of a change in the rotational speed of the second hydraulic machine.

2. The hydrostatic traction drive according to claim 1, wherein the differential is of lockable configuration, and the at least one measure includes locking the differential.

3. The hydrostatic traction drive according to claim 1, wherein the at least one measure includes adapting a torque of the second hydraulic machine.

4. The hydrostatic traction drive according to claim 3, wherein the at least one measure includes reducing the torque of the second hydraulic machine.

5. The hydrostatic traction drive according to claim 1, wherein one or more of the second hydraulic machine and the first hydraulic machine is configured with an adjustable expulsion volume, and wherein the at least one measure includes adapting the expulsion volume of the one or more of the second hydraulic machine and the first hydraulic machine.

6. The hydrostatic traction drive according to claim 5, wherein the at least one measure includes reducing the expulsion volume of the one or more of the second hydraulic machine and the first hydraulic machine.

7. The hydrostatic traction drive according to claim 1, wherein a limiting value of the change in the rotational speed or of a gradient of the rotational speed is stored in the control unit, and wherein the control unit is configured so as to determine upward transgression of the limiting value and the measure is configured to be controlled as a function thereof.

8. The hydrostatic traction drive according to claim 1, wherein the hydrostatic traction drive is configured for a mobile machine.

9. A hydrostatic traction drive, comprising:
a first hydraulic machine that is driven by a drive unit
a second hydraulic machine hydraulically connected to the first hydraulic machine, the second hydraulic machine having a drive that is connected to at least one differential of the traction drive in order to drive wheels; and
a control unit configured to control at least one measure for traction control, the measure controlled as a function of a rotational speed of the second hydraulic machine,
wherein the control unit is configured so as to differentiate the rotational speed of the second hydraulic machine as a function of time.

10. A method for controlling a measure for traction control of a hydrostatic traction drive, the traction drive including a first hydraulic machine that is driven by a drive unit, a second hydraulic machine hydraulically connected to the first hydraulic machine, the second hydraulic machine having a drive that is connected to at least one differential of the traction drive in order to drive wheels, and a control unit, the method comprising:
controlling the measure as a function of a rotational speed of the second hydraulic machine, the measure configured to be controlled by the control unit,
wherein controlling the measure as a function of a rotational speed of the second hydraulic machine takes place as a function of a change in the rotational speed over time.

11. The method according to claim 10, wherein the at least one measure includes one or more of locking the differential and adapting the torque of the second hydraulic machine.

12. The method according to claim 10, wherein the control unit is configured to determine the change of the rotational speed over time by a differentiation of the rotational speed.

13. The method according to claim 12, wherein the control unit is configured to determine the change of the rotational speed over time by determining a gradient of the rotational speed over time.

14. The method according to claim 10, wherein the control unit is configured to determine an upward transgression of a limiting value of the change in the rotational speed over time, and wherein one or more of the differential is locked and the torque of the second hydraulic machine is adapted as a function of the upward transgression.

* * * * *